(12) United States Patent
Sun et al.

(10) Patent No.: US 12,096,347 B2
(45) Date of Patent: Sep. 17, 2024

(54) SWITCHING MECHANISM BETWEEN HST SFN SCHEME AND NR SINGLE TRP AND MULTI-TRP SCHEMES

(71) Applicant: APPLE INC., Cupertino, CA (US)

(72) Inventors: Haitong Sun, Cupertino, CA (US); Chunxuan Ye, San Diego, CA (US); Dawei Zhang, Cupertino, CA (US); Hong He, Cupertino, CA (US); Huaning Niu, Cupertino, CA (US); Manasa Raghavan, Cupertino, CA (US); Sigen Ye, San Diego, CA (US); Wei Zeng, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 337 days.

(21) Appl. No.: 17/593,245

(22) PCT Filed: Mar. 31, 2021

(86) PCT No.: PCT/CN2021/084684
§ 371 (c)(1),
(2) Date: Sep. 14, 2021

(87) PCT Pub. No.: WO2022/205179
PCT Pub. Date: Oct. 6, 2022

(65) Prior Publication Data
US 2023/0199629 A1 Jun. 22, 2023

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC ..... H04W 76/11; H04W 72/04; H04W 48/18; H04W 48/16; H04W 36/0009;
(Continued)

(56) References Cited

U.S. PATENT DOCUMENTS

2014/0274064 A1* 9/2014 Al-Shalash et al. ........................
H04W 28/0226
2018/0183643 A1* 6/2018 Kang et al. ........... H04L 27/266
(Continued)

FOREIGN PATENT DOCUMENTS

CN 111586862 A 8/2020
WO WO 2021/163508 A1 * 8/2021 ............ H04W 72/04

OTHER PUBLICATIONS

Maleki et al. (CN 113287360 A), Selective Cross-slot Scheduling For NR User Equipment (see title). (Year: 2021).*
(Continued)

*Primary Examiner* — Meless N Zewdu
(74) *Attorney, Agent, or Firm* — Dorsey & Whitney LLP

(57) ABSTRACT

Switching schemes at a mobile device may include, in response to being within range of a transmission and reception point (TRP) of a plurality of TRPs associated with a high speed train (HST), decoding a communication received from a network. The communication may include a first radio resource control (RRC) information element (IE) having an HST configuration associated with an HST scheme. The HST configuration may be applied to thereby operate using the HST scheme. In response to being out of range of the plurality of TRPs associated with the HST, a communication received from the network may be decoded. The communication may include a second RRC IE having a non-HST configuration associated with a non-HST scheme. The non-HST configuration may be applied to thereby operate using the non-HST scheme.

6 Claims, 10 Drawing Sheets

(58) Field of Classification Search
CPC . H04W 36/00835; H04W 36/00; H04W 4/42; H04W 4/40; H04W 4/38; H04W 4/50; H04W 8/08; H04W 36/083; H04W 48/04; H04W 84/005; H04W 88/00; H04W 88/02; H04W 88/08; H04W 88/18; H04W 92/10; H04W 64/006; H04W 36/32; H04W 36/324; H04W 36/34; H04W 36/36; H04W 36/008357; H04W 36/13; H04W 48/20; H04W 48/17; H04W 60/00; H04W 60/06; H04W 60/04; H04W 36/08; H04W 48/12; H04L 2012/40293; H04L 47/767

See application file for complete search history.

(56) References Cited

U.S. PATENT DOCUMENTS

| | | | | |
|---|---|---|---|---|
| 2018/0213595 | A1* | 7/2018 | Lee et al. | H04W 84/005 |
| 2019/0140789 | A1* | 5/2019 | Tang | H04L 5/0032 |
| 2019/0387505 | A1* | 12/2019 | Ugurlu et al. | H04W 72/042 |
| 2020/0236605 | A1 | 7/2020 | Yiu | |

OTHER PUBLICATIONS

Gao, et al. (CN 115066838 A), Method Of Parameter Configuration For Frequency Modulation (see title) (Year: 2022).*

CN 113179551 A) >>> Downlink Transmission For High-speed Scenes (title). (Year: 2021).*

Huawei, Hisilicon, "Discussion on enhanced transmission schemes for NR UE HST FR1 performance requirements", R4-21xxxxx, 3GPP TSG-RAN WG4 Meeting #98-e, Electronic Meeting, Agenda Item 11.6.3.3, Jan. 25-Feb. 5, 2020, 4 pages.

PCT/CN2021/084684, International Search Report and Written Opinion, Dec. 30, 2021, 9 pages.

Vivo, "Evaluation and discussion on HST-SFN schemes", R1-2005367, 3GPP TSG RAN WG1 #102-e, e-Meeting, Agenda Item 8.1.2.4, Aug. 17-28, 2020, 10 pages.

ZTE, "Discussion on Multi-TRP HST enhancements", R1-2100289, 3GPP TSG RAN WG1 meeting #104-e, e-Meeting, Agenda Item 8.1.2.4, Jan. 25-Feb. 5, 2021, 7 pages.

* cited by examiner

SWITCHING MECHANISM BETWEEN HST SFN SCHEME AND NR SINGLE TRP AND MULTI-TRP SCHEMES

TECHNICAL FIELD

This application relates generally to wireless communication systems, including switching between various schemes at a mobile device.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
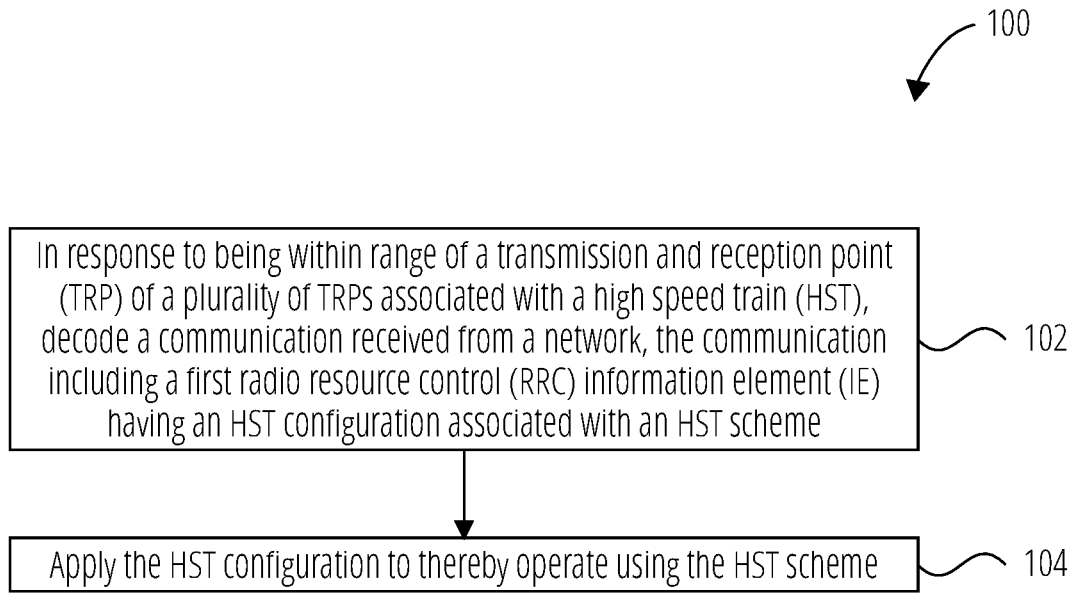
FIG. 1 illustrates a flowchart of a method for switching schemes at a mobile device, in accordance with one embodiment.

Expectations associated with mobile data speeds continue to increase in all types of situations along with the increase in mobile device usage. In an example, high speed trains (HST) are a particularly difficult circumstance for providing quality mobile data connections. A user equipment (UE) discussed further with respect to UE 522 of FIG. 5 below (e.g., a mobile phone, a tablet, a laptop, a router device for providing mobile data on an HST, etc.—also referred to herein as simply a mobile device or device) in HST scenarios may travel between two transmission reception points (TRPs) in HST scenarios. In such scenarios (i.e., HST scenarios), a UE may observe a very high positive Doppler shift from one TRP and a very high negative Doppler shift from the other TRP. As a result, the composite channel can vary quickly (e.g., approximately 2 kilohertz (kHz) or more). Such variation can potentially reduce the channel capability and/or provide challenges associated with the UE performing accurate channel estimation.

In general, two solutions associated with HST scenarios may be utilized: 1. Allow the UE to estimate two separate Doppler shifts, one from each TRP, in order to assist UE channel estimation; or 2. Allow the network (NW) to pre-compensate for the Doppler shift, in which case the NW has to know the Doppler shift.

By way of background, in 3GPP Release 15 (Rel-15), NR is limited to supporting a single TRP (sTRP) scheme. In addition, Dynamic Point Selection (DPS) can be transparently supported on downlink (DL) by: 1. Utilizing downlink control information (DCI) to dynamically indicate a quasi co-location (QCL) property to receive PDSCH via transmission configuration indication (TCI); and 2. Configuring physical channel and signals with specific scrambling ID.

Similarly, in 3GPP Release 16 (Rel-16), six different schemes are designed for Multi-TRP operation, including: 1. Multi-DCI based Multi-TRP operation; and 2. Single-DCI based Multi-TRP operation, which includes: a. SDM Scheme: Spatial Domain Multiplexing (SDM) with a single Transport Block (TB); b. FDMSchemeA: Frequency Domain Multiplexing (FDM) with a single TB; c. FDMSchemeB: Frequency Domain Multiplexing with dual TB; d. TDMSchemeA: Time Domain Multiplexing (TDM) with intra-slot repetition; and e. Scheme 4: Time Domain Multiplexing with inter-slot repetition.

In addition, in 3GPP Release 17 (Rel-17), to enhance High Speed Train (HST) scenarios, it has been agreed to support a HST single frequency network (SFN) scheme (also referred to as Scheme 1) with the following: 1. Tracking reference signals (TRSs) are transmitted in TRP-specific/non-SFN manner; and 2. Demodulation reference signals (DM-RSs) and physical downlink control channel (PDCCH)/physical downlink shared channel (PDSCH) from TRPs are transmitted in SFN manner.

Accordingly, the solutions herein address: 1. Switching mechanisms between the Rel-17 High Speed Train (HST) scheme 1 (HST Scheme 1) and the Rel-15 Single-TRP Dynamic Point Selection (Rel-15 sTRP DPS scheme or Rel-15 DPS scheme); and 2. Switching mechanisms between the HST Scheme 1 and the Rel-16, Single DCI Multi TRP (Rel-16 sDCI mTRP SDM scheme or Rel-16 SDM). In particular, the principles described herein first include five solutions for switching mechanisms between the HST Scheme 1 and the Rel-15 sTRP DPS scheme, followed by five solutions for switching mechanisms between the HST Scheme 1 and the Rel-16 sDCI mTRP SDM scheme.

In a first solution for switching between the Rel-17 HST Scheme 1 and the Rel-15 sTRP DPS scheme, a radio resource control (RRC) based solution may be utilized. For instance, in a first option of the first solution, a new RRC information element (IE) may be included within one or more of the following existing entities to configure switching between the Rel-17 HST Scheme 1 and the Rel-15 sTRP DPS scheme: 1. ServingCellConfig; 2. ServingCellConfigCommon; 3. ServingCellConfigCommonSIB; 4. BWP-DownlinkDedicated; and 5. PDSCH-Config.

In a second option of the first solution, the existing Rel-16 IE, HighSpeedConfig-r16, may be reused. More particularly, see the following:

---

HighSpeedConfig-r16 ::= SEQUENCE {
  highSpeedMeasFlag-r16   ENUMERATED   {true} OPTIONAL,
-- Need R
  highSpeedDemodFlag-r16  ENUMERATED   {true} OPTIONAL,
-- Need R
  ...
}

---

With respect to the first solution described above, once the RRC configuration has been configured, the following restrictions may also be considered: 1. For PDSCH, a medium access control (MAC) control element (MAC-CE) is limited to activating transmission configuration indication (TCI) codepoints with two TCI states; and 2. With respect to the DCI field, the Transmission Configuration Indication, is limited to indicating a TCI codepoint with two TCI states.

In a second solution for switching between the Rel-17 HST Scheme 1 and the Rel-15 sTRP DPS scheme, a UE can indicate to a NW that the UE is limited to supporting RRC-based switching. In such embodiments (i.e., the UE being limited to supporting RRC-based switching), when Rel-17 HST Scheme 1 has been configured by RRC (as further described with respect to the first solution above), the UE may be limited to expecting an indication with a TCI codepoint having two TCI states for PDSCH reception.

In a third solution for switching between the Rel-17 HST Scheme 1 and the Rel-15 sTRP DPS scheme, MAC-CE may be used. In particular, the existing MAC-CE further described in 3GPP TS 38.321 Clause 6.1.3.24 associated with Enhanced TCI States Activation/Deactivation for UE-specific PDSCH MAC CE may be used as follows: 1. To indicate to a UE to operate in Rel-17 HST Scheme 1. In such embodiments, a MAC-CE can be used to activate TCI codepoints for PDSCH, wherein every activated TCI codepoint has two TCI states (i.e., TCI codepoints having two TCI states indicates operation in Rel-17 HST Scheme 1); and 2. To indicate UE to operate in Rel-15 sTRP DPS. In such embodiments, a MAC-CE can be used to activate TCI codepoints for PDSCH, wherein every activated TCI codepoint has one TCI state (i.e., TCI codepoints having one TCI state indicates operation in Rel-15 sTRP DPS).

In a fourth solution for switching between the Rel-17 HST Scheme 1 and the Rel-15 sTRP DPS scheme, a DCI-based dynamic switching mechanism may be used. In particular, the existing MAC-CE further described in 3GPP TS 38.321 may be used to activate different TCI codepoints for PDSCH. Such TCI codepoints may contain one TCI state or two TCI states. In the fourth solution, when a TCI codepoint with a single TCI state is indicated the UE may operate using the Rel-15 sTRP DPS scheme and when a TCI codepoint with two TCI States is indicated the UE may operate using the Rel-17 HST Scheme 1. For each dynamically scheduled PDSCH, TCI codepoints may be indicated via the DCI field, Transmission Configuration Indication.

In a fifth solution for switching between the Rel-17 HST Scheme 1 and the Rel-15 sTRP DPS scheme, when the DCI-based dynamic switching mechanism as described in the fourth solution is used, the UE can report separate UE PDSCH processing capabilities for a minimum switching delay. Currently, such capabilities are reported as timeDurationForQCL and can only be reported for 60 kHz and 120 kHz subcarrier spacing (SCS). For instance, see:

---

| timeDurationForQCL | SEQUENCE { |
|---|---|
| scs-60kHz | ENUMERATED {s7, s14, s28} |
| scs-120kHz | ENUMERATED {S14, S28} |
| } | |

---

However, the fifth solution may include the UE reporting different values for timeDurationForQCL, which may be valid when using DCI-based dynamic switching between the Rel-17 HST Scheme 1 and the Rel-15 sTRP DPS scheme. In such embodiments, the UE may also report a value for 15 kHz and 30 kHz SCS. In addition, any appropriate value for timeDurationForQCL may be used.

By way of background regarding solutions for switching between the Rel-17 HST Scheme 1 and Rel-16 sDCI mTRP SDM scheme (or Scheme 1a), Rel-16 sDCI mTRP SDM scheme (or Scheme 1a) may include: 1. An indication in a DCI field, Transmission Configuration Indication, including a TCI codepoint with two TCI states; 2. A DCI field, Antenna Port(s), including demodulation reference signal (DMRS) antenna ports having two code division multiplexing (CDM) groups without data; and 3. A DCI field, Time Domain Resource Assignment, including an indicated time domain resource assignment (TDRA) entry that does not have a "repetitionNumber."

In a first solution for switching between the Rel-17 HST Scheme 1 and the Rel-16 sDCI mTRP SDM scheme (or Scheme 1a), an RRC-based solution may be utilized. As a first option using an RRC-based solution, a new RRC IE may be used with respect to one or more of the following existing IEs: 1. ServingCellConfig; 2. ServingCellConfig- Common; 3. ServingCellConfigCommonSIB; 4. BWP-DownlinkDedicated; and 5. PDSCH-Config.

As a second option, the existing Rel-16 IE, HighSpeed-Config-r16 may be reused. In particular, see:

```
HighSpeedConfig-r-16 ::=  SEQUENCE {
   highSpeedMeasFlag-r16   ENUMERATED {true} OPTIONAL,
-- Need R
   highSpeedDemodFlag-r16  ENUMERATED {true} OPTIONAL,
-- Need R
   ...
}
```

When using the RRC-based switching configuration and operating in Rel-17 HST Scheme 1, regardless of the number of CDM groups without data indicated in the DCI and regardless of whether "repetitionNumber" is configured in the TDRA entry indicated by DCI, the UE may continue to operate in Rel-17 HST Scheme 1. In such circumstances, the UE may also expect a TCI codepoint with two TCI states to be indicated by DCI.

In a second solution for switching between the Rel-17 HST Scheme 1 and the Rel-16 SDM scheme, a UE can indicate to a NW that the UE is limited to supporting RRC-based switching. When the UE is limited to supporting RRC-based switching and the Rel-17 HST Scheme 1 has been configured by RRC, the following may also apply: 1. UE still operates in Rel-17 HST Scheme 1 even if the number of CDM groups without data indicated in a DCI is two; 2. The UE may ignore the "repetitionNumber" even if it is configured in the TDRA entry indicated by a DCI; and 3. The UE may expect an indication with a TCI codepoint having two TCI states for PDSCH reception.

In a third solution for switching between the Rel-17 HST Scheme 1 and the Rel-16 SDM scheme, MAC-CE may be used. In particular, a new MAC-CE can be introduced to directly activate or deactivate the Rel-17 HST Scheme 1. In such embodiments, when the Rel-17 HST scheme 1 is activated, the following may also apply: 1. The UE may operate in the Rel-17 HST Scheme 1 even if the number of CDM groups without data indicated in a DCI is two; 2. The UE may ignore the "repetitionNumber" even if it is configured in the TDRA entry indicated by a DCI; and 3. The UE may expect an indication with a TCI codepoint having two TCI states for PDSCH reception.

In a fourth solution for switching between the Rel-17 HST Scheme 1 and the Rel-16 SDM scheme, a DCI-based dynamic switching mechanism may be used. In particular, the DCI field, Antenna Port(s), may be used to dynamically toggle between the Rel-17 HST Scheme 1 and the Rel-16 SDM scheme as follows: 1. The Rel-17 HST Scheme 1 may be utilized when the DMRS antenna ports include one or three CDM groups without data; and 2. The Rel-16 SDM may be utilized when the DMRS antenna ports include two CDM groups without data. Accordingly, based on the DCI indication, the UE can switch between the Rel-17 HST Scheme 1 reception and Rel-16 SDM reception with the following conditions: 1. Rel-17 HST Scheme 1 reception is applicable when: a. The DCI field, Transmission Configuration Indication, includes a TCI codepoint with two TCI states indicated; b. The DCI field, Antenna Port(s), includes DMRS antenna ports having one or three CDM groups without data; and c. The DCI field, Time Domain Resource Assignment, includes the indicated TDRA entry not having a "repetitionNumber;" and 2. Rel-16 SDM reception is applicable when: a. The DCI field, Transmission Configuration Indication, includes a TCI codepoint with two TCI states indicated; b. The DCI field, Antenna Port(s), includes DMRS antenna ports having two CDM groups without data; and c. The DCI field, Time Domain Resource Assignment, includes the indicated TDRA entry not having a "repetitionNumber."

In a fifth solution for switching between the Rel-17 HST Scheme 1 and the Rel-16 SDM scheme, when the DCI-based dynamic switching mechanism as described in the fourth solution is used, the UE can report separate PDSCH processing capabilities for a minimum switching delay. Currently, such capabilities are reported as timeDurationForQCL and can only be reported for 60 kHz and 120 kHz subcarrier spacing (SCS). For instance, see:

```
timeDurationForQCL       SEQUENCE {
   scs-60kHz             ENUMERATED {s7, s14, s28}
   scs-120kHz            ENUMERATED {S14, S28}
}
```

However, the fifth solution may include the UE reporting different values for timeDurationForQCL, which may be valid when using DCI-based dynamic switching between the Rel-17 HST Scheme 1 and the Rel-16 SDM scheme. In such embodiments, the UE may also report a value for 15 kHz and 30 kHz SCS. In addition, any appropriate value for timeDurationForQCL may be used.

FIG. 1 illustrates a flowchart of a method 100 for switching schemes at a mobile device. In block 102, the method 100, in response to being within range of a transmission and reception point (TRP) of a plurality of TRPs associated with a high speed train (HST), decodes a communication received from a network. For instance, the communication may include a first radio resource control (RRC) information element (IE) having an HST configuration associated with an HST scheme. In an example, the HST scheme may comprise Rel-17 HST Scheme 1. In block 104, the method 100 applies the HST configuration to thereby operate using the HST scheme. For instance, the mobile device may apply the Rel-17 HST Scheme 1 to thereby operate using such scheme.

The method 100 may also include, in response to being out of range of the plurality of TRPs associated with the HST, decoding a communication received from the network. The communication may include a second RRC IE having a non-HST configuration associated with a non-HST scheme. The non-HST configuration may then be applied to thereby operate using the non-HST scheme.

The method 100 may also include the non-HST scheme comprising a 3GPP Release 15 single-TRP (sTRP) dynamic point selection (DPS) scheme or a 3GPP Release 16 single downlink control information (DCI) multi-TRP (mTRP) spatial domain multiplexing (SDM) scheme.

The method 100 may also include the mobile device continuing to operate using the HST scheme regardless of a number of code division multiplexing (CDM) groups without data indicated in a downlink control information (DCI) and regardless of a configuration of a repetitionNumber in a time domain resource assignment (TDRA) entry indicated by the DCI.

The method 100 may also include encoding a communication for transmission to the network indicating the mobile device is limited to supporting RRC-based switching between schemes. The method 100 may also include the first RRC IE and the second RRC IE comprising at least one of ServingCellConfig, ServingCellConfigCommon, Serving- CellConfigCommonSIB, BWP-DownlinkDedicated, or PDSCH-Config. The method 100 may also include the first RRC IE or the second RRC IE comprising HighSpeedConfig-r16. The method 100 may also include the first RRC IE and the second RRC IE comprising a same RRC IE.

Figure 2:
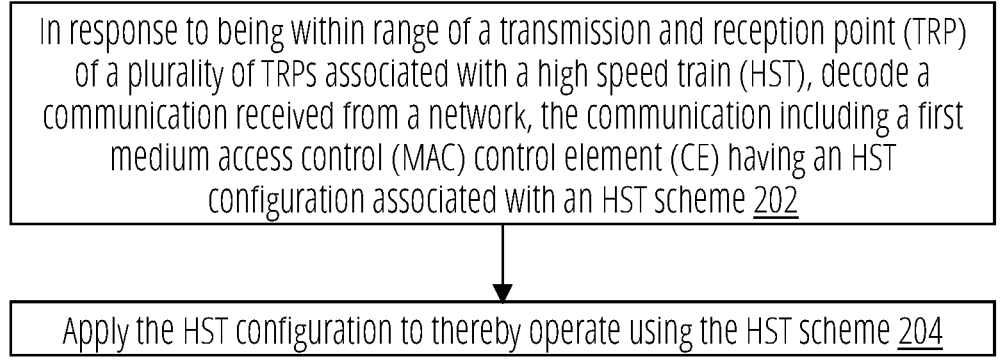
FIG. 2 illustrates a flowchart of a method for switching schemes at a mobile device, in accordance with one embodiment.

FIG. 2 illustrates a flowchart of a method 200 for switching schemes at a mobile device. In block 202, the method 200, in response to being within range of a transmission and reception point (TRP) of a plurality of TRPs associated with a high speed train (HST), decodes a communication received from a network. The communication may include a first medium access control (MAC) control element (CE) having an HST configuration associated with an HST scheme. For instance, the HST scheme may comprise Rel-17 HST Scheme 1. In block 204, the method 200 applies the HST configuration to thereby operate using the HST scheme. For instance, the mobile device may apply the Rel-17 HST Scheme 1 to thereby operate using such scheme.

The method 200 may also include the first MAC-CE being used to activate transmission configuration indication (TCI) codepoints for a physical downlink shared channel (PDSCH). Each of the activated TCI codepoints may have two TCI states. The method 200 may also include, in response to being out of range of the plurality of TRPs associated with the HST, decoding a communication received from the network. The communication may include a second MAC CE having a non-HST configuration associated with a non-HST scheme. The non-HST configuration may be applied to thereby operate using the non-HST scheme.

The method 200 may also include the non-HST scheme comprising a 3GPP Release 15 single-TRP (sTRP) dynamic point selection (DPS) scheme or a 3GPP Release 16 single downlink control information (DCI) multi-TRP (mTRP) spatial domain multiplexing (SDM) scheme. The method 200 may also include the second MAC-CE being used to activate transmission configuration indication (TCI) codepoints for a physical downlink shared channel (PDSCH). Each of the activated TCI codepoints may have one TCI state, in such embodiments.

Figure 3:
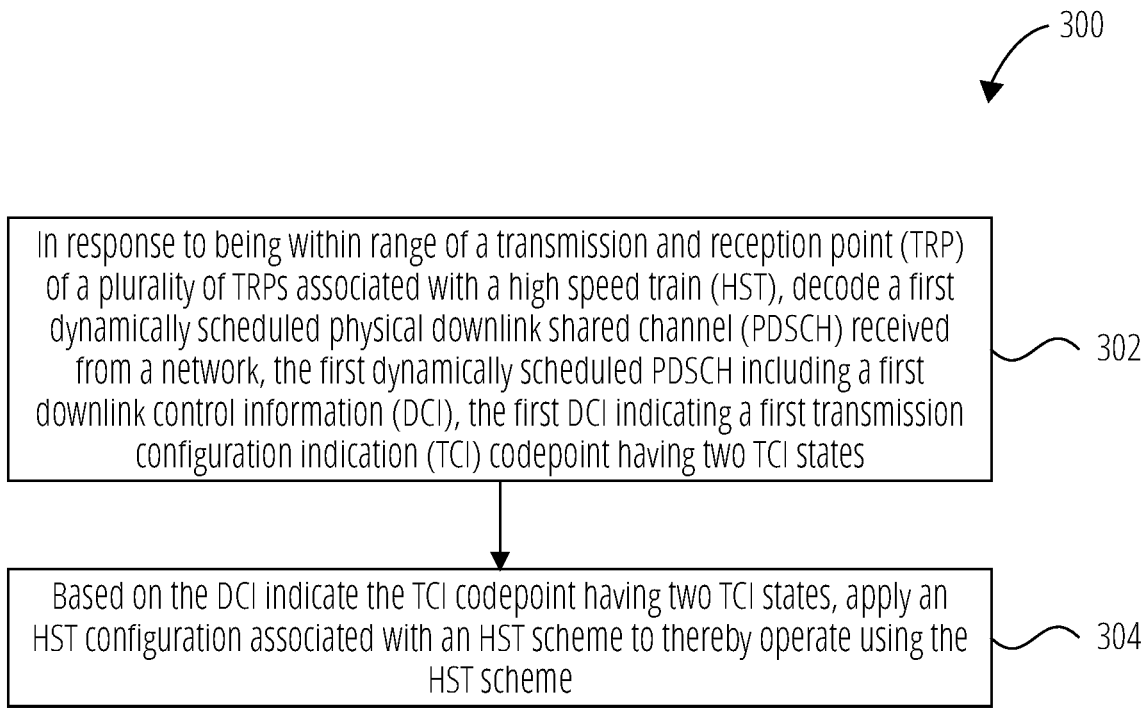
FIG. 3 illustrates a flowchart of a method for switching schemes at a mobile device, in accordance with one embodiment.

FIG. 3 illustrates a flowchart of a method 300 for switching schemes at a mobile device. In block 302, the method 300, in response to being within range of a transmission and reception point (TRP) of a plurality of TRPs associated with a high speed train (HST), decodes a first dynamically scheduled physical downlink shared channel (PDSCH) received from a network. The first dynamically scheduled PDSCH may include a first downlink control information (DCI) and the first DCI may indicate a first transmission configuration indication (TCI) codepoint having two TCI states. In block 304, the method 300, based on the DCI indicating the TCI codepoint having two TCI states, may apply an HST configuration associated with an HST scheme to thereby operate using the HST scheme. For instance, the HST scheme may comprise the Rel-17 HST Scheme 1.

The method 300 may also include, in response to being out of range of the plurality of TRPs associated with the HST, decoding a second dynamically scheduled PDSCH received from a network. The second dynamically scheduled PDSCH may include a second DCI, and the second DCI may indicate a second TCI codepoint having one TCI state. Based on the DCI indicating the TCI codepoint having one TCI state, a non-HST configuration associated with a non-HST scheme may be applied to thereby operate using the non-HST scheme. For instance, the HST scheme may comprise the Rel-17 HST Scheme 1.

The method 300 may also include encoding a communication for transmission to the network. The communication may indicate a PDSCH processing capability associated with a minimum scheme switching delay corresponding to the mobile device, wherein the PDSCH processing capability is associated with 15 kilohertz (kHz) subcarrier spacing (SCS), 30 kHz SCS, 60 kHz SCS, or 120 kHz SCS. The method 300 may also include the first TCI codepoint and the second TCI codepoint each being activated using a medium access control (MAC) control element (CE).

Figure 4:
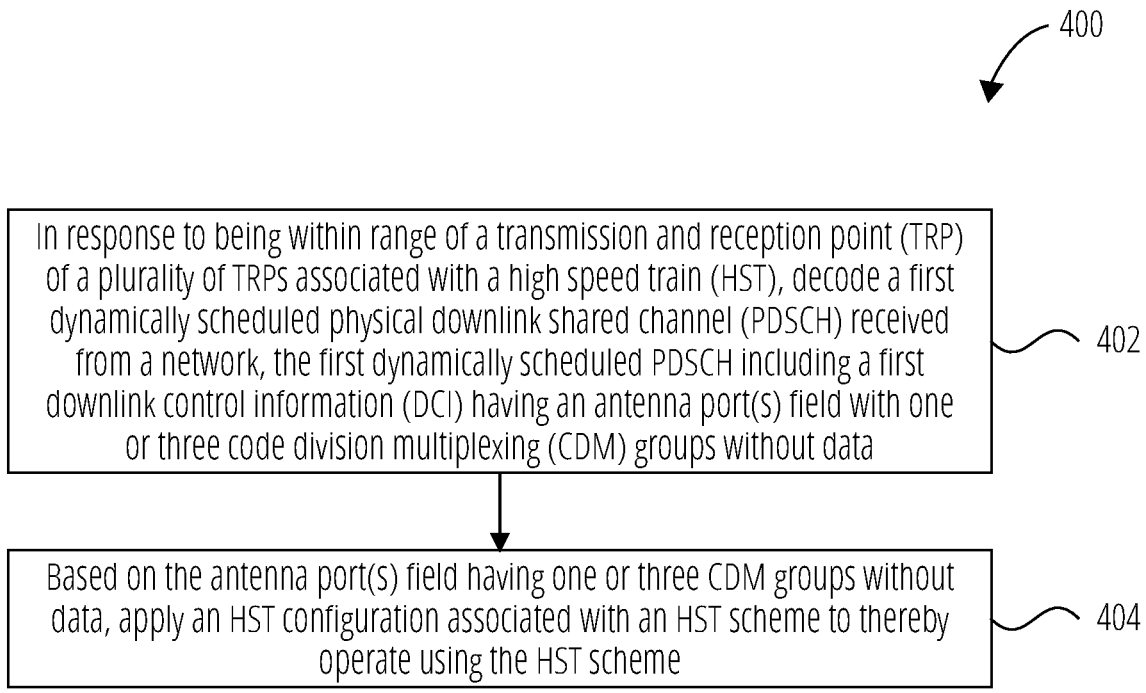
FIG. 4 illustrates a flowchart of a method for switching schemes at a mobile device, in accordance with one embodiment.

FIG. 4 illustrates a flowchart of a method 400 for switching schemes at a mobile device. In block 402, the method 400, in response to being within range of a transmission and reception point (TRP) of a plurality of TRPs associated with a high speed train (HST), decodes a first dynamically scheduled physical downlink shared channel (PDSCH) received from a network. The first dynamically scheduled PDSCH may include a first downlink control information (DCI) having an antenna port(s) field with one or three code division multiplexing (CDM) groups without data. In block 404, the method 400, based on the antenna port(s) field having one or three CDM groups without data, applies an HST configuration associated with an HST scheme to thereby operate using the HST scheme. For instance, the HST scheme may comprise the Rel-17 HST Scheme 1.

The method 400 may also include, in response to being out of range of the plurality of TRPs associated with the HST, decoding a second dynamically scheduled PDSCH received from the network. The second dynamically scheduled PDSCH may include a second DCI having an antenna port(s) field with two CDM groups without data. Based on the antenna port(s) field having two CDM groups without data, a non-HST configuration associated with a non-HST scheme may be applied to thereby operate using the non-HST scheme.

The method 400 may also include encoding a communication for transmission to the network. The communication may indicate a PDSCH processing capability associated with a minimum scheme switching delay corresponding to the mobile device, wherein the PDSCH processing capability is associated with 15 kilohertz (kHz) subcarrier spacing (SCS), 30 kHz SCS, 60 kHz SCS, or 120 kHz SCS.

Figure 5:
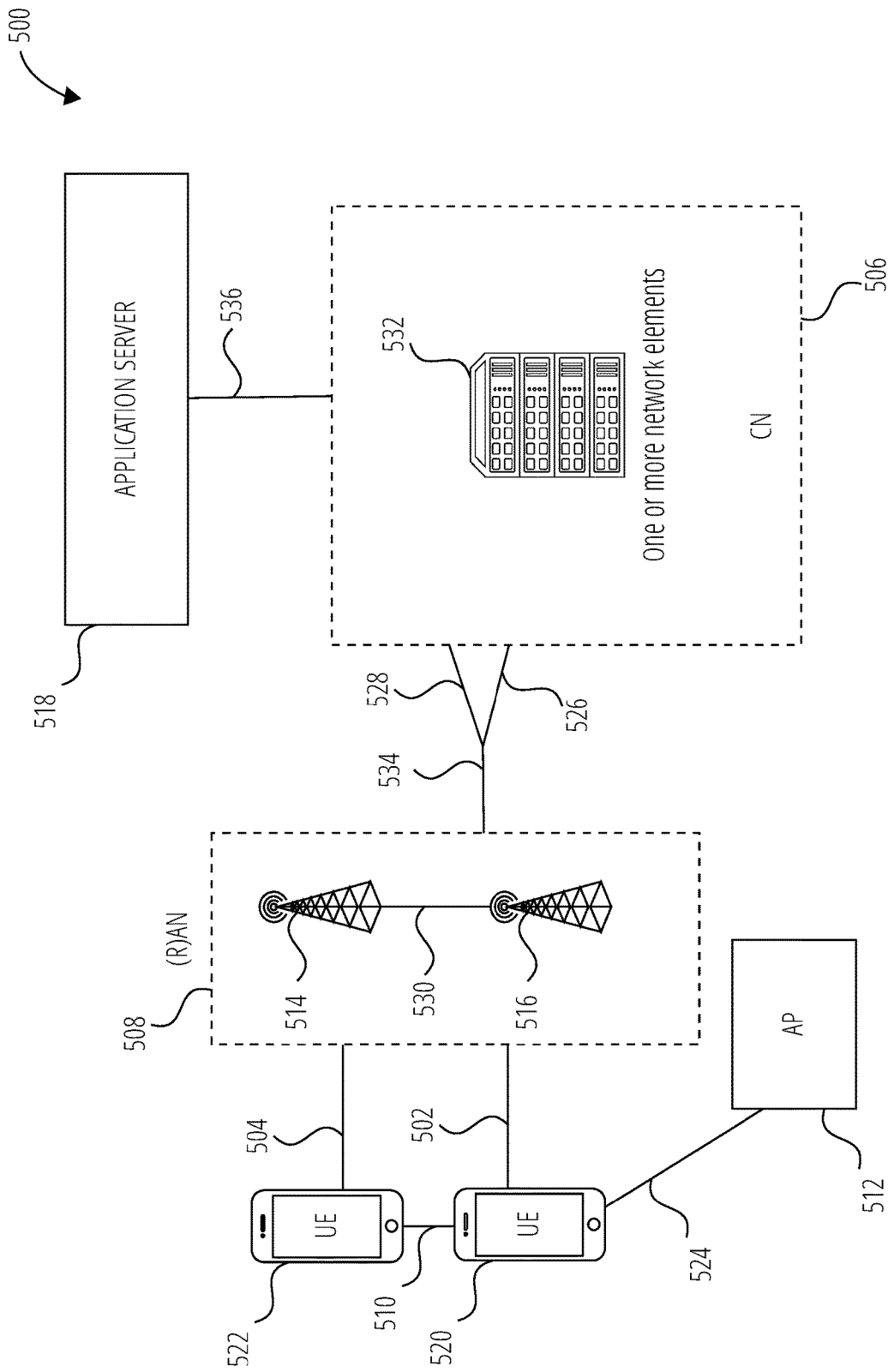
FIG. 5 illustrates a system in accordance with one embodiment.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 522 and UE 520. In this example, the UE 522 and the UE 520 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 522 and/or the UE 520 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 522 and UE 520 may be configured to connect, for example, communicatively couple, with an access node or radio access node (shown as (R)AN 508). In embodiments, the (R)AN 508 may be an NG RAN or a SG RAN, an E-UTRAN, or a legacy RAN, such as a UTRAN or GERAN. As used herein, the term "NG RAN" or the like may refer to a (R)AN 508 that operates in an NR or SG system, and the term "E-UTRAN" or the like may refer to a (R)AN 508 that operates in an LTE or 4G system. The UE 522 and UE 520 utilize connections (or channels) (shown as connection 504 and connection 502, respectively), each of which comprises a physical communications interface or layer (discussed in further detail below).

In this example, the connection 504 and connection 502 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 522 and UE 520 may directly exchange communication data via a ProSe interface 510. The ProSe interface 510 may alternatively be referred to as a sidelink (SL) interface 110 and may comprise one or more logical channels, including but not limited to a PSCCH, a PSSCH, a PSDCH, and a PSBCH.

The UE 520 is shown to be configured to access an AP 512 (also referred to as "WLAN node," "WLAN," "WLAN Termination," "WT" or the like) via connection 524. The connection 524 can comprise a local wireless connection, such as a connection consistent with any IEEE 802.11 protocol, wherein the AP 512 would comprise a wireless fidelity (Wi-Fi®) router. In this example, the AP 512 may be connected to the Internet without connecting to the core network of the wireless system (described in further detail below). In various embodiments, the UE 520, (R)AN 508, and AP 512 may be configured to utilize LWA operation and/or LWIP operation. The LWA operation may involve the UE 520 in RRC_CONNECTED being configured by the RAN node 514 or the RAN node 516 to utilize radio resources of LTE and WLAN. LWIP operation may involve the UE 520 using WLAN radio resources (e.g., connection 524) via IPsec protocol tunneling to authenticate and encrypt packets (e.g., IP packets) sent over the connection 524. IPsec tunneling may include encapsulating the entirety of original IP packets and adding a new packet header, thereby protecting the original header of the IP packets.

The (R)AN 508 can include one or more AN nodes, such as RAN node 514 and RAN node 516, that enable the connection 504 and connection 502. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 500 (e.g., an eNB). According to various embodiments, the RAN node 514 or RAN node 516 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 514 or RAN node 516 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 514 or RAN node 516); a MAC/PHY split wherein RRC, PDCP, RLC, and MAC layers are operated by the CRAN/vBBUP and the PHY layer is operated by individual RAN nodes (e.g., RAN node 514 or RAN node 516); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 514 or RAN node 516 to perform other virtualized applications. In some implementations, an individual RAN node may represent individual gNB-DUs that are connected to a gNB-CU via individual F1 interfaces (not shown by FIG. 5). In these implementations, the gNB-DUs may include one or more remote radio heads or RFEMs, and the gNB-CU may be operated by a server that is located in the (R)AN 508 (not shown) or by a server pool in a similar manner as the CRAN/vBBUP. Additionally, or alternatively, one or more of the RAN node 514 or RAN node 516 may be next generation eNBs (ng-eNBs), which are RAN nodes that provide E-UTRA user plane and control plane protocol terminations toward the UE 522 and UE 520, and are connected to an SGC via an NG interface (discussed infra). In V2X scenarios one or more of the RAN node 514 or RAN node 516 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 514 and/or the RAN node 516 can terminate the air interface protocol and can be the first point of contact for the UE 522 and UE 520. In some embodiments, the RAN node 514 and/or the RAN node 516 can fulfill various logical functions for the (R)AN 508 including, but not limited to, radio network controller (RNC) functions such as radio bearer management, uplink and downlink dynamic radio resource management and data packet scheduling, and mobility management.

In embodiments, the UE 522 and UE 520 can be configured to communicate using OFDM communication signals with each other or with the RAN node 514 and/or the RAN node 516 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 514 and/or the RAN node 516 to the UE 522 and UE 520, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 522 and UE 520 and the RAN node 514 and/or the RAN node 516 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 522 and UE 520 and the RAN node 514 or RAN node 516 may operate using LAA, eLAA, and/or feLAA mechanisms. In these implementations, the UE 522 and UE 520 and the RAN node 514 or RAN node 516 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 522 and UE 520, RAN node 514 or RAN node 516, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 522, AP 512, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 522 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 522 and UE 520. The PDCCH carries information about the transport format and resource allocations related to the PDSCH channel, among other things. It may also inform the UE 522 and UE 520 about the transport format, resource allocation, and HARQ information related to the uplink shared channel. Typically, downlink scheduling (assigning control and shared channel resource blocks to the UE 520 within a cell) may be performed at any of the RAN node 514 or RAN node 516 based on channel quality information fed back from any of the UE 522 and UE 520. The downlink resource assignment information may be sent on the PDCCH used for (e.g., assigned to) each of the UE 522 and UE 520.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 514 or RAN node 516 may be configured to communicate with one another via interface 530. In embodiments where the system 500 is an LTE system (e.g., when CN 506 is an EPC), the interface 530 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 522 from an SeNB for user data; information of PDCP PDUs that were not delivered to a UE 522; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system (e.g., when CN 506 is an SGC), the interface 530 may be an Xn interface. The Xn interface is defined between two or more RAN nodes (e.g., two or more gNBs and the like) that connect to SGC, between a RAN node 514 (e.g., a gNB) connecting to SGC and an eNB, and/or between two eNBs connecting to 5GC (e.g., CN 506). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 522 in a connected mode (e.g., CM-CONNECTED) including functionality to manage the UE mobility for connected mode between one or more RAN node 514 or RAN node 516. The mobility support may include context transfer from an old (source) serving RAN node 514 to new (target) serving RAN node 516; and control of user plane tunnels between old (source) serving RAN node 514 to new (target) serving RAN node 516. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 508 is shown to be communicatively coupled to a core network-in this embodiment, CN 506. The CN 506 may comprise one or more network elements 532, which are configured to offer various data and telecommunications services to customers/subscribers (e.g., users of UE 522 and UE 520) who are connected to the CN 506 via the (R)AN 508. The components of the CN 506 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 506 may be referred to as a network slice, and a logical instantiation of a portion of the CN 506 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 518 may be an element offering applications that use IP bearer resources with the core network (e.g., UMTS PS domain, LTE PS data services, etc.). The application server 518 can also be configured to support one or more communication services (e.g., VoIP sessions, PTT sessions, group communication sessions, social networking services, etc.) for the UE 522 and UE 520 via the EPC. The application server 518 may communicate with the CN 506 through an IP communications interface 536.

In embodiments, the CN 506 may be an SGC, and the (R)AN 116 may be connected with the CN 506 via an NG interface 534. In embodiments, the NG interface 534 may be split into two parts, an NG user plane (NG-U) interface 526, which carries traffic data between the RAN node 514 or RAN node 516 and a UPF, and the S1 control plane (NG-C) interface 528, which is a signaling interface between the RAN node 514 or RAN node 516 and AMFs.

In embodiments, the CN 506 may be a SG CN, while in other embodiments, the CN 506 may be an EPC). Where CN 506 is an EPC, the (R)AN 116 may be connected with the CN 506 via an S1 interface 534. In embodiments, the S1 interface 534 may be split into two parts, an S1 user plane (S1-U) interface 526, which carries traffic data between the RAN node 514 or RAN node 516 and the S-GW, and the S1-MME interface 528, which is a signaling interface between the RAN node 514 or RAN node 516 and MMEs.

Figure 6:
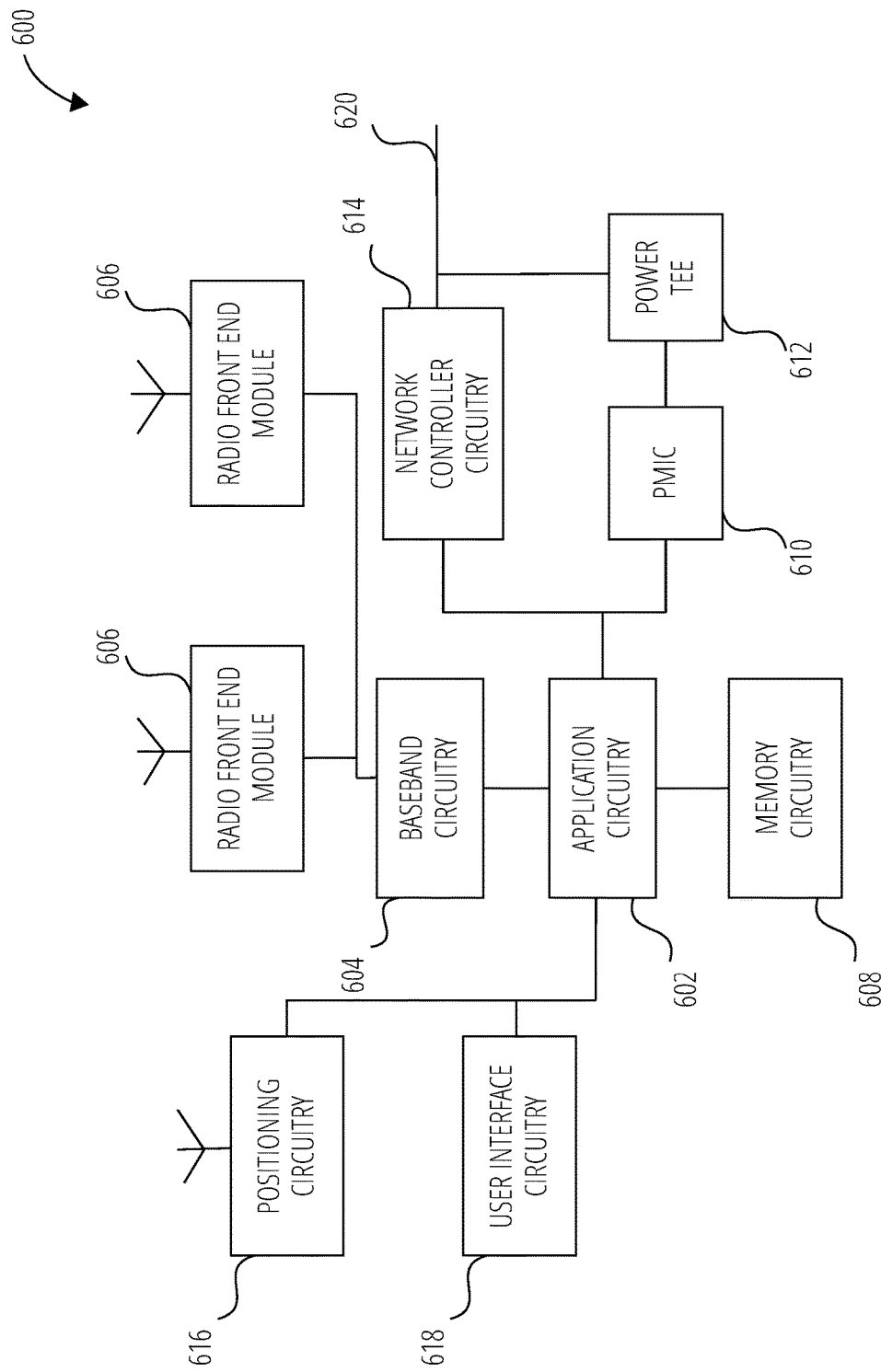
FIG. 6 illustrates an infrastructure equipment in accordance with one embodiment.

FIG. 6 illustrates an example of infrastructure equipment 600 in accordance with various embodiments. The infrastructure equipment 600 may be implemented as a base station, radio head, RAN node, AN, application server, and/or any other element/device discussed herein. In other examples, the infrastructure equipment 600 could be implemented in or by a UE.

The infrastructure equipment 600 includes application circuitry 602, baseband circuitry 604, one or more radio front end module 606 (RFEM), memory circuitry 608, power management integrated circuitry (shown as PMIC 610), power tee circuitry 612, network controller circuitry 614, network interface connector 620, satellite positioning circuitry 616, and user interface circuitry 618. In some embodiments, the device infrastructure equipment 600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 602 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 602 may be coupled with or may include memory/storage elements and may be configured to execute instructions stored in the memory/storage to enable various applications or operating systems to run on the infrastructure equipment 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 602 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 602 may comprise, or may be, a special-purpose processor/controller to operate according to the various embodiments herein. As examples, the processor(s) of application circuitry 602 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 600 may not utilize application circuitry 602, and instead may include a special-purpose processor/controller to process IP data received from an EPC or 5GC, for example.

In some implementations, the application circuitry 602 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 602 may comprise logic blocks or logic fabric, and other interconnected resources that may be programmed to perform various functions, such as the procedures, methods, functions, etc. of the various embodiments discussed herein. In such embodiments, the circuitry of application circuitry 602 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like. The baseband circuitry 604 may be implemented, for example, as a solder-down substrate including one or more integrated circuits, a single packaged integrated circuit soldered to a main circuit board or a multi-chip module containing two or more integrated circuits.

The user interface circuitry 618 may include one or more user interfaces designed to enable user interaction with the infrastructure equipment 600 or peripheral component interfaces designed to enable peripheral component interaction with the infrastructure equipment 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 606 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 606, which incorporates both mmWave antennas and sub-mmWave.

The memory circuitry 608 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 608 may be implemented as one or more of solder down packaged integrated circuits, socketed memory modules and plug-in memory cards.

The PMIC 610 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 612 may provide for electrical power drawn from a network cable to provide both power supply and data connectivity to the infrastructure equipment 600 using a single cable.

The network controller circuitry 614 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 620 using a physical connection, which may be electrical (commonly referred to as a "copper interconnect"), optical, or wireless. The network controller circuitry 614 may include one or more dedicated processors and/or FPGAs to communicate using one or more of the aforementioned protocols. In some implementations, the network controller circuitry 614 may include multiple controllers to provide connectivity to other networks using the same or different protocols.

Figure 7:
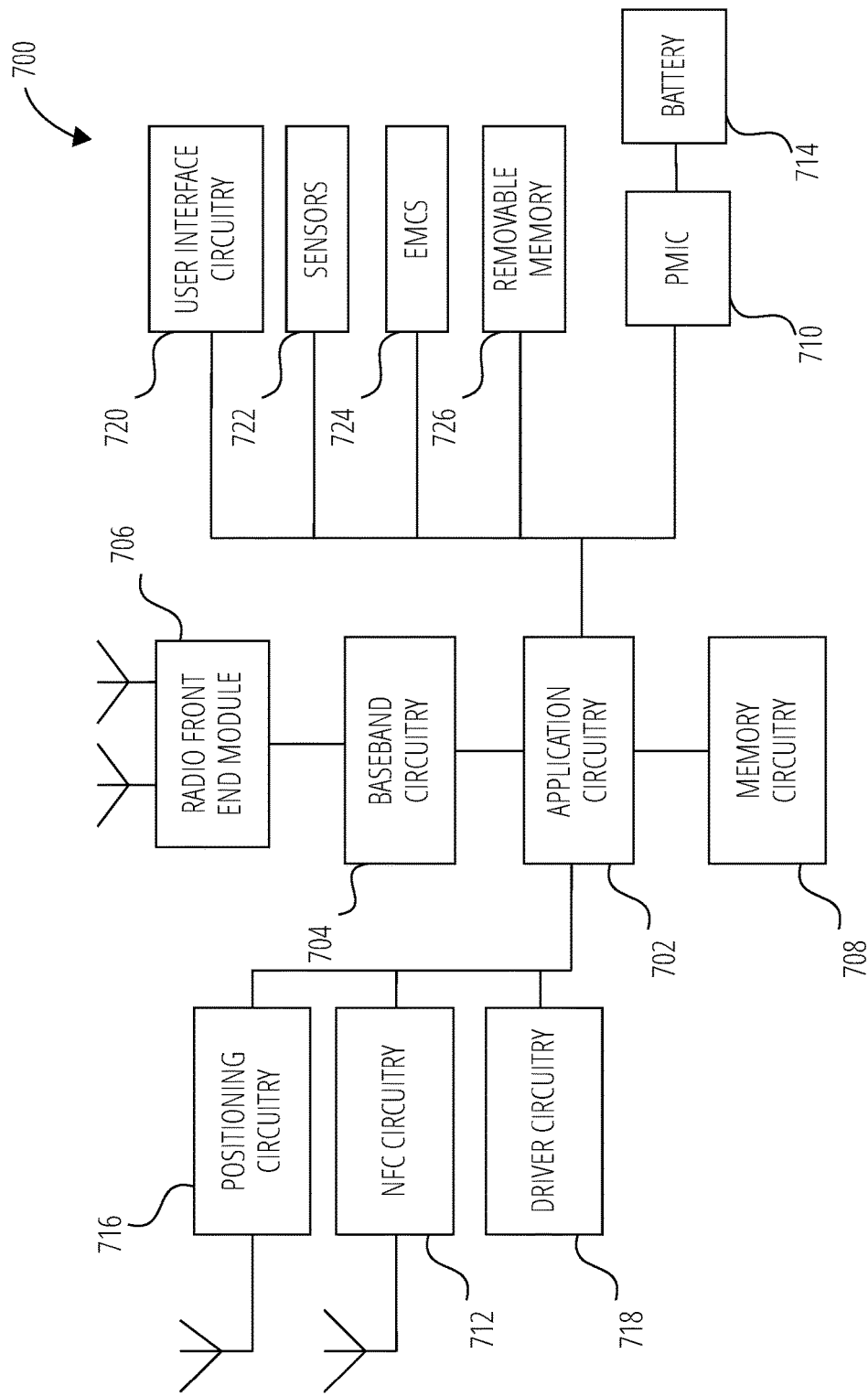
FIG. 7 illustrates a platform in accordance with one embodiment.

FIG. 7 illustrates an example of a platform 700 in accordance with various embodiments. In embodiments, the computer platform 700 may be suitable for use as UEs, application servers, and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

Application circuitry 702 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 702 may be coupled with or may include memory/storage elements and may be configured to execute instructions stored in the memory/storage to enable various applications or operating systems to run on the platform 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 702 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 702 may comprise, or may be, a special-purpose processor/controller to operate according to the various embodiments herein.

As examples, the processor(s) of application circuitry 702 may include an Intel® Architecture Core™ based processor, such as a Quark™, an Atom™, an i3, an i5, an i7, or an MCU-class processor, or another such processor available from Intel® Corporation. The processors of the application circuitry 702 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 702 may be a part of a system on a chip (SoC) in which the application circuitry 702 and other components are formed into a single integrated circuit, or a single package, such as the Edison™ or Galileo™ SoC boards from Intel® Corporation.

Additionally or alternatively, application circuitry 702 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 702 may comprise logic blocks or logic fabric, and other interconnected resources that may be programmed to perform various functions, such as the procedures, methods, functions, etc. of the various embodiments discussed herein. In such embodiments, the circuitry of application circuitry 702 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 704 may be implemented, for example, as a solder-down substrate including one or more integrated circuits, a single packaged integrated circuit soldered to a main circuit board or a multi-chip module containing two or more integrated circuits.

The radio front end module 706 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 706, which incorporates both mmWave antennas and sub-mmWave.

The memory circuitry 708 may include any number and type of memory devices used to provide for a given amount of system memory. As examples, the memory circuitry 708 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 708 may be developed in accordance with a Joint Electron Devices Engineering Council (JEDEC) low power double data rate (LPDDR)-based design, such as LPDDR2, LPDDR3, LPDDR4, or the like. Memory circuitry 708 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 708 may be on-die memory or registers associated with the application circuitry 702. To provide for persistent storage of information such as data, applications, operating systems and so forth, memory circuitry 708 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 700 may incorporate the three-dimensional (3D) cross-point (XPOINT) memories from Intel® and Micron®.

The removable memory 726 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry include sensors 722 and electro-mechanical components (shown as EMCs 724), as well as removable memory devices coupled to removable memory 726.

The sensors 722 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 724 include devices, modules, or subsystems whose purpose is to enable platform 700 to change its state, position, and/or orientation, or move or control a mechanism or (sub)system. Additionally, EMCs 724 may be configured to generate and send messages/signaling to other components of the platform 700 to indicate a current state of the EMCs 724. Examples of the EMCs 724 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 is configured to operate one or more EMCs 724 based on one or more captured events and/or instructions or control signals received from a service provider and/or various clients. In some implementations, the interface circuitry may connect the platform 700 with positioning circuitry 716.

In some implementations, the interface circuitry may connect the platform 700 with Near-Field Communication circuitry (shown as NFC circuitry 712). The NFC circuitry 712 is configured to provide contactless, short-range communications based on radio frequency identification (RFID) standards, wherein magnetic field induction is used to enable communication between NFC circuitry 712 and NFC-enabled devices external to the platform 700 (e.g., an "NFC touchpoint"). NFC circuitry 712 comprises an NFC controller coupled with an antenna element and a processor coupled with the NFC controller. The NFC controller may be a chip/IC providing NFC functionalities to the NFC circuitry 712 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 712, or initiate data transfer between the NFC circuitry 712 and another active NFC device (e.g., a smartphone or an NFC-enabled POS terminal) that is proximate to the platform 700.

The driver circuitry 718 may include software and hardware elements that operate to control particular devices that are embedded in the platform 700, attached to the platform 700, or otherwise communicatively coupled with the platform 700. The driver circuitry 718 may include individual drivers allowing other components of the platform 700 to interact with or control various input/output (I/O) devices that may be present within, or connected to, the platform 700. For example, driver circuitry 718 may include a display driver to control and allow access to a display device, a touchscreen driver to control and allow access to a touchscreen interface of the platform 700, sensor drivers to obtain sensor readings of sensors 722 and control and allow access to sensors 722, EMC drivers to obtain actuator positions of the EMCs 724 and/or control and allow access to the EMCs 724, a camera driver to control and allow access to an embedded image capture device, audio drivers to control and allow access to one or more audio devices.

The power management integrated circuitry (shown as PMIC 710) (also referred to as "power management circuitry") may manage power provided to various components of the platform 700. In particular, with respect to the baseband circuitry 704, the PMIC 710 may control power-source selection, voltage scaling, battery charging, or DC-to-DC conversion. The PMIC 710 may often be included when the platform 700 is capable of being powered by a battery 714, for example, when the device is included in a UE.

In some embodiments, the PMIC 710 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 714 may power the platform 700, although in some examples the platform 700 may be mounted deployed in a fixed location, and may have a power supply coupled to an electrical grid. The battery 714 may be a lithium ion battery, a metal-air battery, such as a zinc-air battery, an aluminum-air battery, a lithium-air battery, and the like. In some implementations, such as in V2X applications, the battery 714 may be a typical lead-acid automotive battery.

In some implementations, the battery 714 may be a "smart battery," which includes or is coupled with a Battery Management System (BMS) or battery monitoring integrated circuitry. The BMS may be included in the platform 700 to track the state of charge (SoCh) of the battery 714. The BMS may be used to monitor other parameters of the battery 714 to provide failure predictions, such as the state of health (SoH) and the state of function (SoF) of the battery 714. The BMS may communicate the information of the battery 714 to the application circuitry 702 or other components of the platform 700. The BMS may also include an analog-to-digital (ADC) convertor that allows the application circuitry 702 to directly monitor the voltage of the battery 714 or the current flow from the battery 714. The battery parameters may be used to determine actions that the platform 700 may perform, such as transmission frequency, network operation, sensing frequency, and the like.

A power block, or other power supply coupled to an electrical grid may be coupled with the BMS to charge the battery 714. In some examples, the power block may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 714, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 720 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 720 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensors 722 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 700 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 8:
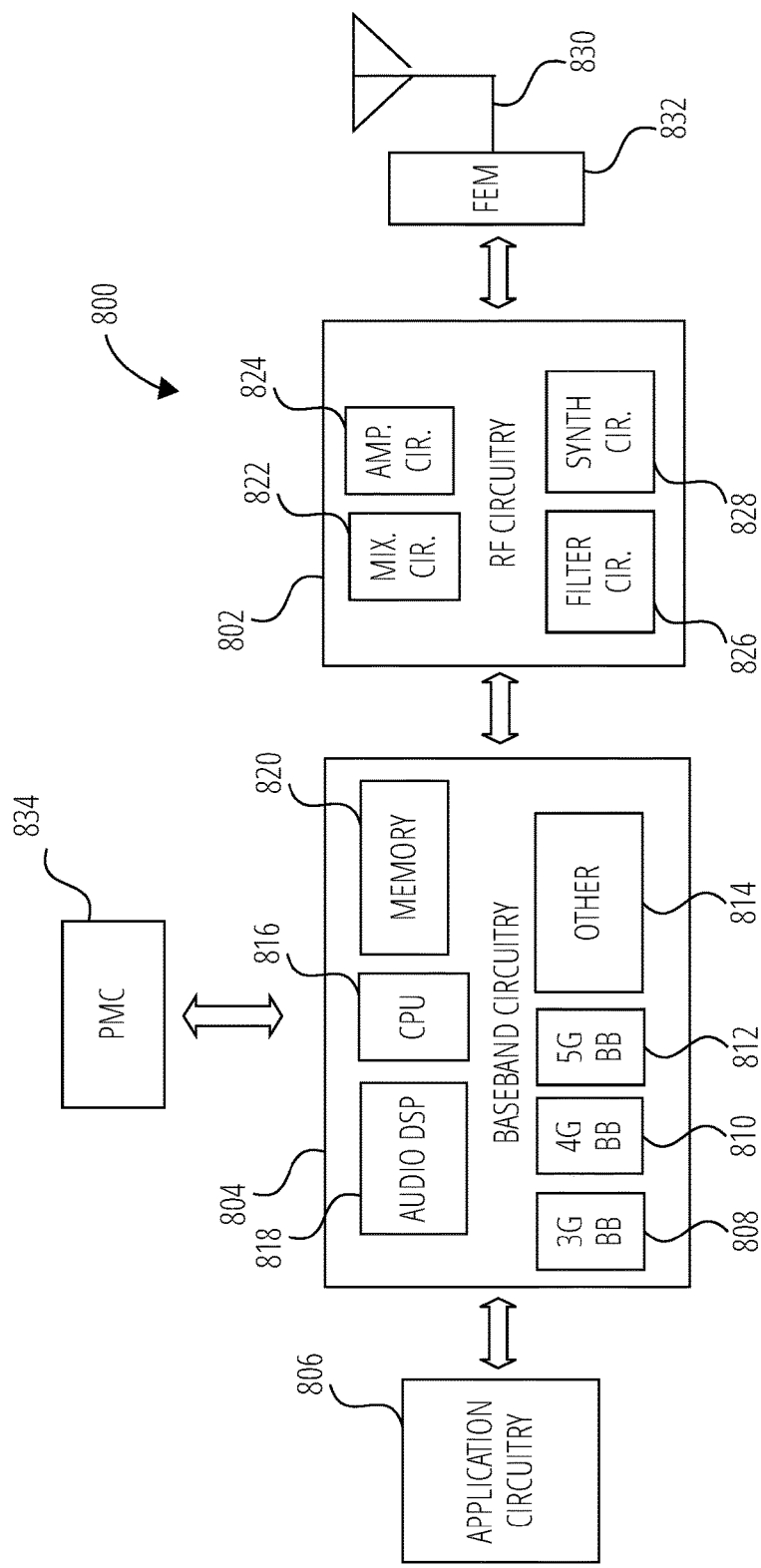
FIG. 8 illustrates a device in accordance with one embodiment.

FIG. 8 illustrates example components of a device 800 in accordance with some embodiments. In some embodiments, the device 800 may include application circuitry 806, baseband circuitry 804, Radio Frequency (RF) circuitry (shown as RF circuitry 802), front-end module (FEM) circuitry (shown as FEM circuitry 832), one or more antennas 830, and power management circuitry (PMC) (shown as PMC 834) coupled together at least as shown. The components of the illustrated device 800 may be included in a UE or a RAN node. In some embodiments, the device 800 may include fewer elements (e.g., a RAN node may not utilize application circuitry 806, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 806 may include one or more application processors. For example, the application circuitry 806 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 806 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 802 and to generate baseband signals for a transmit signal path of the RF circuitry 802. The baseband circuitry 804 may interface with the application circuitry 806 for generation and processing of the baseband signals and for controlling operations of the RF circuitry 802. For example, in some embodiments, the baseband circuitry 804 may include a third generation (3G) baseband processor (3G baseband processor 808), a fourth generation (4G) baseband processor (4G baseband processor 810), a fifth generation (5G) baseband processor (5G baseband processor 812), or other baseband processor(s) 814 for other existing generations, generations in development or to be developed in the future (e.g., second generation (2G), sixth generation (6G), etc.). The baseband circuitry 804 (e.g., one or more of baseband processors) may handle various radio control functions that enable communication with one or more radio networks via the RF circuitry 802. In other embodiments, some or all of the functionality of the illustrated baseband processors may be included in modules stored in the memory 820 and executed via a Central Processing Unit (CPU 816). The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include a digital signal processor (DSP), such as one or more audio DSP(s) 818. The one or more audio DSP(s) 818 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 806 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 802 may enable communication with wireless networks using modulated electromagnetic radiation through a non-solid medium. In various embodiments, the RF circuitry 802 may include switches, filters, amplifiers, etc. to facilitate the communication with the wireless network. The RF circuitry 802 may include a receive signal path which may include circuitry to down-convert RF signals received from the FEM circuitry 832 and provide baseband signals to the baseband circuitry 804. The RF circuitry 802 may also include a transmit signal path which may include circuitry to up-convert baseband signals provided by the baseband circuitry 804 and provide RF output signals to the FEM circuitry 832 for transmission.

In some embodiments, the receive signal path of the RF circuitry 802 may include mixer circuitry 822, amplifier circuitry 824 and filter circuitry 826. In some embodiments, the transmit signal path of the RF circuitry 802 may include filter circuitry 826 and mixer circuitry 822. The RF circuitry 802 may also include synthesizer circuitry 828 for synthesizing a frequency for use by the mixer circuitry 822 of the receive signal path and the transmit signal path. In some embodiments, the mixer circuitry 822 of the receive signal path may be configured to down-convert RF signals received from the FEM circuitry 832 based on the synthesized frequency provided by synthesizer circuitry 828. The amplifier circuitry 824 may be configured to amplify the down-converted signals and the filter circuitry 826 may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 822 of the receive signal path may comprise passive mixers, although the scope of the embodiments is not limited in this respect.

In some embodiments, the mixer circuitry 822 of the transmit signal path may be configured to up-convert input baseband signals based on the synthesized frequency provided by the synthesizer circuitry 828 to generate RF output signals for the FEM circuitry 832. The baseband signals may be provided by the baseband circuitry 804 and may be filtered by the filter circuitry 826.

In some embodiments, the mixer circuitry 822 of the receive signal path and the mixer circuitry 822 of the transmit signal path may include two or more mixers and may be arranged for quadrature downconversion and upconversion, respectively. In some embodiments, the mixer circuitry 822 of the receive signal path and the mixer circuitry 822 of the transmit signal path may include two or more mixers and may be arranged for image rejection (e.g., Hartley image rejection). In some embodiments, the mixer circuitry 822 of the receive signal path and the mixer circuitry 822 may be arranged for direct downconversion and direct upconversion, respectively. In some embodiments, the mixer circuitry 822 of the receive signal path and the mixer circuitry 822 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 802 may include analog-to-digital converter (ADC) and digital-to-analog converter (DAC) circuitry and the baseband circuitry 804 may include a digital baseband interface to communicate with the RF circuitry 802.

In some dual-mode embodiments, a separate radio IC circuitry may be provided for processing signals for each spectrum, although the scope of the embodiments is not limited in this respect.

In some embodiments, the synthesizer circuitry 828 may be a fractional-N synthesizer or a fractional N/N+1 synthesizer, although the scope of the embodiments is not limited in this respect as other types of frequency synthesizers may be suitable. For example, synthesizer circuitry 828 may be a delta-sigma synthesizer, a frequency multiplier, or a synthesizer comprising a phase-locked loop with a frequency divider.

The synthesizer circuitry 828 may be configured to synthesize an output frequency for use by the mixer circuitry 822 of the RF circuitry 802 based on a frequency input and a divider control input. In some embodiments, the synthesizer circuitry 828 may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 806 (such as an applications processor) depending on the desired output frequency. In some embodiments, a divider control input (e.g., N) may be determined from a look-up table based on a channel indicated by the application circuitry 806.

Synthesizer circuitry 828 of the RF circuitry 802 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 828 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 802 may include an IQ/polar converter.

The FEM circuitry 832 may include a receive signal path which may include circuitry configured to operate on RF signals received from one or more antennas 830, amplify the received signals and provide the amplified versions of the received signals to the RF circuitry 802 for further processing. The FEM circuitry 832 may also include a transmit signal path which may include circuitry configured to amplify signals for transmission provided by the RF circuitry 802 for transmission by one or more of the one or more antennas 830. In various embodiments, the amplification through the transmit or receive signal paths may be done solely in the RF circuitry 802, solely in the FEM circuitry 832, or in both the RF circuitry 802 and the FEM circuitry 832.

In some embodiments, the FEM circuitry 832 may include a TX/RX switch to switch between transmit mode and receive mode operation. The FEM circuitry 832 may include a receive signal path and a transmit signal path. The receive signal path of the FEM circuitry 832 may include an LNA to amplify received RF signals and provide the amplified received RF signals as an output (e.g., to the RF circuitry 802). The transmit signal path of the FEM circuitry 832 may include a power amplifier (PA) to amplify input RF signals (e.g., provided by the RF circuitry 802), and one or more filters to generate RF signals for subsequent transmission (e.g., by one or more of the one or more antennas 830).

In some embodiments, the PMC 834 may manage power provided to the baseband circuitry 804. In particular, the PMC 834 may control power-source selection, voltage scaling, battery charging, or DC-to-DC conversion. The PMC 834 may often be included when the device 800 is capable of being powered by a battery, for example, when the device 800 is included in a UE. The PMC 834 may increase the power conversion efficiency while providing desirable implementation size and heat dissipation characteristics.

FIG. 8 shows the PMC 834 coupled only with the baseband circuitry 804. However, in other embodiments, the PMC 834 may be additionally or alternatively coupled with, and perform similar power management operations for, other components such as, but not limited to, the application circuitry 806, the RF circuitry 802, or the FEM circuitry 832.

In some embodiments, the PMC 834 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 806 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 806 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
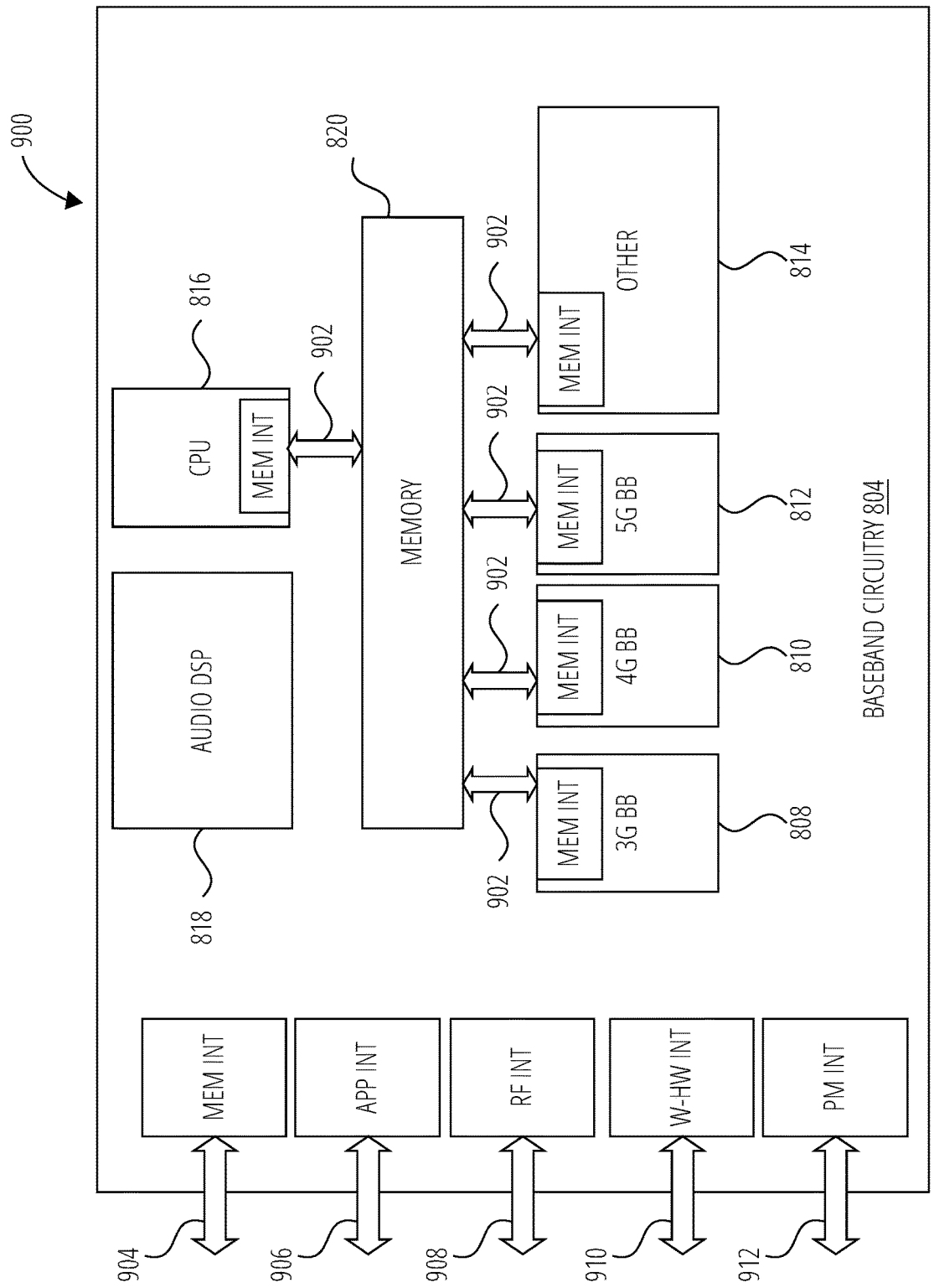
FIG. 9 illustrates example interfaces in accordance with one embodiment.

FIG. 9 illustrates example interfaces 900 of baseband circuitry in accordance with some embodiments. As discussed above, the baseband circuitry 804 of FIG. 8 may comprise 3G baseband processor 808, 4G baseband processor 810, 5G baseband processor 812, other baseband processor(s) 814, CPU 816, and a memory 820 utilized by said processors. As illustrated, each of the processors may include a respective memory interface 902 to send/receive data to/from the memory 820.

The baseband circuitry 804 may further include one or more interfaces to communicatively couple to other circuitries/devices, such as a memory interface 904 (e.g., an interface to send/receive data to/from memory external to the baseband circuitry 804), an application circuitry interface 906 (e.g., an interface to send/receive data to/from the application circuitry 806 of FIG. 8), an RF circuitry interface 908 (e.g., an interface to send/receive data to/from RF circuitry 802 of FIG. 8), a wireless hardware connectivity interface 910 (e.g., an interface to send/receive data to/from Near Field Communication (NFC) components, Bluetooth® components (e.g., Bluetooth® Low Energy), Wi-Fi® components, and other communication components), and a power management interface 912 (e.g., an interface to send/receive power or control signals to/from the PMC 834.

Figure 10:
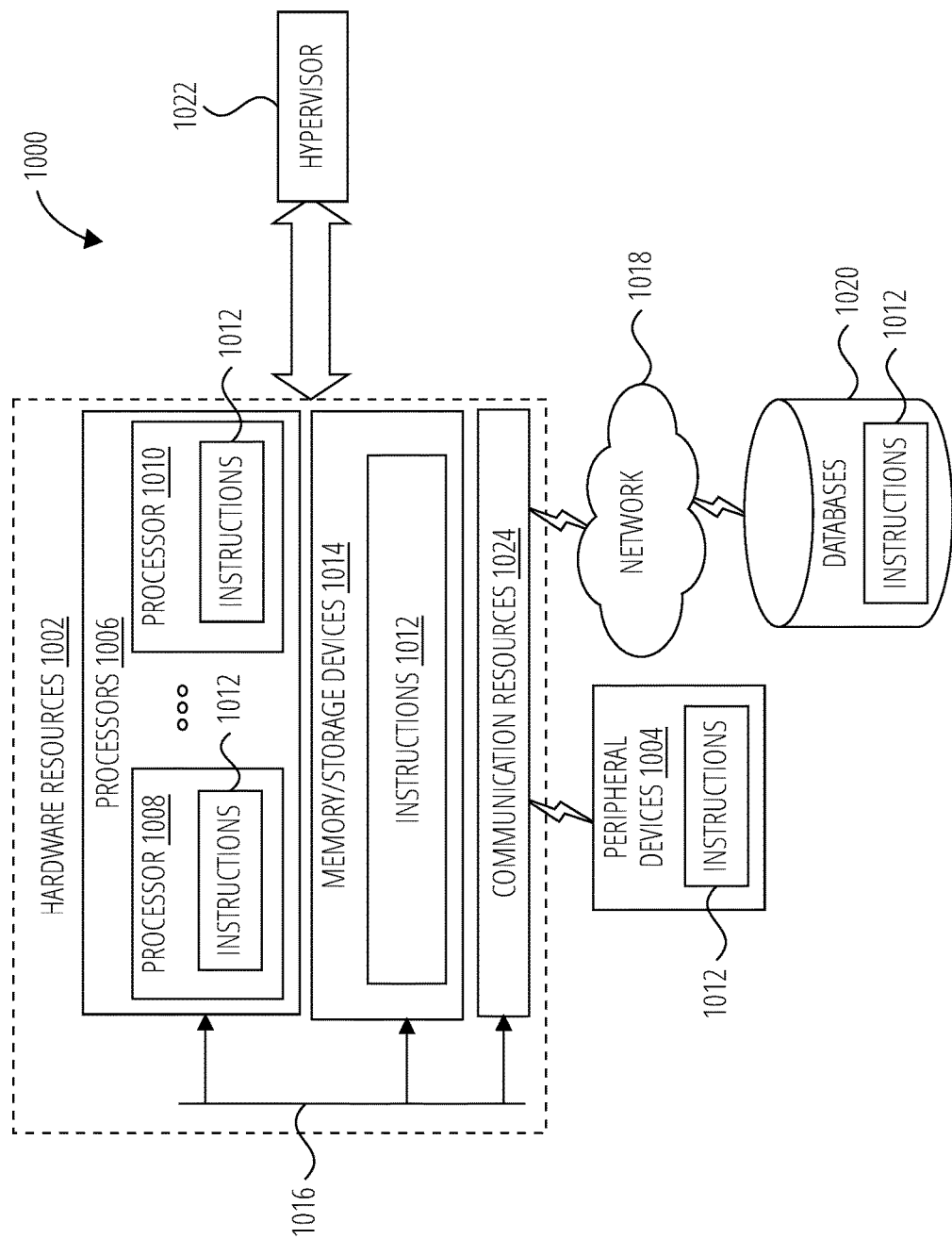
FIG. 10 illustrates components in accordance with one embodiment.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1006 (or processor cores), one or more memory/storage devices 1014, and one or more communication resources 1024, each of which may be communicatively coupled via a bus 1016. For embodiments where node virtualization (e.g., NFV) is utilized, a hypervisor 1022 may be executed to provide an execution environment for one or more network slices/sub-slices to utilize the hardware resources 1002.

The processors 1006 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1008 and a processor 1010.

The memory/storage devices 1014 may include main memory, disk storage, or any suitable combination thereof. The memory/storage devices 1014 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1024 may include interconnection or network interface components or other suitable devices to communicate with one or more peripheral devices 1004 or one or more databases 1020 via a network 1018. For example, the communication resources 1024 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1012 may comprise software, a program, an application, an applet, an app, or other executable code for causing at least any of the processors 1006 to perform any one or more of the methodologies discussed herein. The instructions 1012 may reside, completely or partially, within at least one of the processors 1006 (e.g., within the processor's cache memory), the memory/storage devices 1014, or any suitable combination thereof. Furthermore, any portion of the instructions 1012 may be transferred to the hardware resources 1002 from any combination of the peripheral devices 1004 or the databases 1020. Accordingly, the memory of the processors 1006, the memory/storage devices 1014, the peripheral devices 1004, and the databases 1020 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 may include an apparatus comprising means to perform one or more elements of a method described in or related to any method or process described herein.

Example 2 may include one or more non-transitory computer-readable media comprising instructions to cause an electronic device, upon execution of the instructions by one or more processors of the electronic device, to perform one or more elements of a method described in or related to any method or process described herein.

Example 3 may include an apparatus comprising logic, modules, or circuitry to perform one or more elements of a method described in or related to any method or process described herein.

Example 4 may include an apparatus comprising: one or more processors and one or more computer-readable media comprising instructions that, when executed by the one or more processors, cause the one or more processors to perform the method, techniques, or process as described in or related to any embodiments described herein.

Example 5 may include a signal as described in or related to any embodiments described herein.

Example 6 may include a datagram, packet, frame, segment, protocol data unit (PDU), or message as described in or related to any embodiments described herein.

Example 7 may include a method of communicating in a wireless network as shown and described herein.

Example 8 may include a system for providing wireless communication as shown and described herein.

Example 9 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for switching schemes at a mobile device, comprising:
   in response to being within range of a transmission and reception point (TRP) of a plurality of TRPs associated with a high speed train (HST), decoding a first dynamically scheduled physical downlink shared channel (PDSCH) received from a network, the first dynamically scheduled PDSCH including a first downlink control information (DCI), the first DCI indicating a first transmission configuration indication (TCI) codepoint having two TCI states;
   based on the DCI indicating the first TCI codepoint having the two TCI states, applying an HST configuration associated with an HST scheme to thereby operate using the HST scheme;
   in response to being out of range of the plurality of TRPs associated with the HST decoding a second dynamically scheduled PDSCH received from the network, the second dynamically scheduled PDSCH including a second DCI, the second DCI indicating a second TCI codepoint having one TCI state;
   based on the DCI indicating the second TCI codepoint having the one TCI state, applying a non-HST configuration associated with a non-HST scheme to thereby operate using the non-HST scheme; and
   encoding a communication for transmission to the network, the communication indicating a PDSCH processing capability associated with a minimum scheme switching delay corresponding to the mobile device, wherein the PDSCH processing capability is associated with 15 kilohertz (kHz) subcarrier spacing (SCS), 30 kHz SCS, 60 kHz SCS, or 120 kHz SCS.

2. The method of claim 1, wherein the first TCI codepoint and the second TCI codepoint are each activated using a respective medium access control (MAC) control element (CE).

3. An apparatus of a mobile device comprising:
   one or more processors; and
   a memory storing instructions that, when executed by the one or more processors, configure the mobile device to:
      in response to the mobile device being within range of a transmission and reception point (TRP) of a plurality of TRPs associated with a high speed train (HST), decode a first dynamically scheduled physical downlink shared channel (PDSCH) received from a network, the first dynamically scheduled PDSCH including a first downlink control information (DCI), the first DCI indicating a first transmission configuration indication (TCI) codepoint having two TCI states;

based on the DCI indicating the first TCI codepoint having the two TCI states, apply an HST configuration associated with an HST scheme for the mobile device to thereby operate using the HST scheme;

in response to the mobile device being out of range of the plurality of TRPs associated with the HST, decode a second dynamically scheduled PDSCH received from the network, the second dynamically scheduled PDSCH including a second DCI, the second DCI indicating a second TCI codepoint having one TCI state;

based on the DCI indicating the second TCI codepoint having the one TCI state, apply a non-HST configuration associated with a non-HST scheme for the mobile device to thereby operate using the non-HST scheme; and encode a communication for transmission to the network, the communication indicating a PDSCH processing capability associated with a minimum scheme switching delay corresponding to the mobile device, wherein the PDSCH processing capability is associated with 15 kilohertz (kHz) subcarrier spacing (SCS), 30 kHz SCS, 60 kHz SCS, or 120 kHz SCS.

4. The apparatus of claim 3, wherein the first TCI codepoint and the second TCI codepoint are each activated using a respective medium access control (MAC) control element (CE).

5. A non-transitory computer-readable storage medium including instructions that, when executed by one or more processors of a mobile device, cause the mobile device to:

in response to the mobile device being within range of a transmission and reception point (TRP) of a plurality of TRPs associated with a high speed train (HST), decode a first dynamically scheduled physical downlink shared channel (PDSCH) received from a network, the first dynamically scheduled PDSCH including a first downlink control information (DCI), the first DCI indicating a first transmission configuration indication (TCI) codepoint having two TCI states;

based on the DCI indicating the first TCI codepoint having the two TCI states, apply an HST configuration associated with an HST scheme for the mobile device to thereby operate using the HST scheme;

in response to the mobile device being out of range of the plurality of TRPs associated with the HST, decode a second dynamically scheduled PDSCH received from the network, the second dynamically scheduled PDSCH including a second DCI, the second DCI indicating a second TCI codepoint having one TCI state;

based on the DCI indicating the second TCI codepoint having the one TCI state, apply a non-HST configuration associated with a non-HST scheme for the mobile device to thereby operate using the non-HST scheme; and encode a communication for transmission to the network, the communication indicating a PDSCH processing capability associated with a minimum scheme switching delay corresponding to the mobile device, wherein the PDSCH processing capability is associated with 15 kilohertz (kHz) subcarrier spacing (SCS), 30 kHz SCS, 60 kHz SCS, or 120 kHz SCS.

6. The non-transitory computer-readable storage medium of claim 5, wherein the first TCI codepoint and the second TCI codepoint are each activated using a respective medium access control (MAC) control element (CE).

* * * * *